(12) United States Patent
Reynolds

(10) Patent No.: US 6,317,124 B2
(45) Date of Patent: Nov. 13, 2001

(54) GRAPHICS MEMORY SYSTEM THAT UTILIZES DETACHED-Z BUFFERING IN CONJUNCTION WITH A BATCHING ARCHITECTURE TO REDUCE PAGING OVERHEAD

(75) Inventor: Gerald W. Reynolds, Ft. Collins, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/834,316

(22) Filed: Apr. 13, 2001

Related U.S. Application Data

(63) Continuation of application No. 09/042,291, filed on Mar. 13, 1998.

(51) Int. Cl.$^7$ .................................................. G06T 15/40
(52) U.S. Cl. ........................ 345/422; 345/532; 345/531; 345/558; 345/536
(58) Field of Search .................................. 345/422, 531, 345/532, 558, 536

(56) References Cited

U.S. PATENT DOCUMENTS

| | | | |
|---|---|---|---|
| 5,043,921 | * 8/1991 | Gonzalez-Lopez et al. | 364/522 |
| 6,078,336 | * 6/2000 | Reynolds | 345/513 |
| 6,150,679 | * 11/2000 | Reynolds | 257/213 |

* cited by examiner

Primary Examiner—Ulka J. Chauhan
Assistant Examiner—Lance W. Sealey

(57) ABSTRACT

The present invention provides a graphics memory system of a computer graphics display system which utilizes a batching architecture in conjunction with detached Z buffering for minimizing paging overhead. The graphics memory system comprises a memory controller which receives a batch of pixels from a host CPU of the computer graphics display system when a 3D rendering mode is in effect. Each pixel has a pixel color and corresponding Z coordinate associated with it. The memory controller then performs a Z comparison test wherein Z coordinates of the batch are compared with existing Z coordinates read out of a frame buffer memory to determine whether or not each new color of the batch associated with the Z coordinate being compared should be written into the frame buffer memory. If the results of a Z comparison test pass, the new pixel color and Z coordinate are queued for writing into the frame buffer memory. In accordance with the preferred embodiment of the present invention, two memory controllers are implemented in the graphics memory system, each accessing its own frame buffer memory, which is comprised of a RAM storage device. Each memory controller processes a portion of the batch and a color associated with a particular pixel can be processed in one memory controller while the Z coordinate associated with the same pixel is processed in the other memory controller. This allows the memory controllers to access their respective frame buffer memories independently, thus maximizing utilization of the memory bus. The frame buffer memories for each of the memory controllers each comprise an image buffer region and a Z buffer region. The image buffer region is separate from the Z buffer region. Z coordinates are stored in the Z buffer region and pixel colors are stored in the image buffer region. Therefore, the Z coordinates are "detached" from the pixel colors.

17 Claims, 4 Drawing Sheets

GRAPHICS MEMORY SYSTEM THAT UTILIZES DETACHED-Z BUFFERING IN CONJUNCTION WITH A BATCHING ARCHITECTURE TO REDUCE PAGING OVERHEAD

CROSS REFERENCE TO RELATED APPLICATION

This application is a continuation of copending U.S. patent application Ser. No. 09/042,291, entitled "A Graphics Memory System that Utilizes Detached-Z Buffering in Conjunction with a Batching Architecture to Reduce Pageing Overhead," and filed Mar. 13, 1998, which is hereby incorporated by reference.

TECHNICAL FIELD OF THE INVENTION

The present invention relates to a graphics memory system and, more particularly, to a graphics memory system that utilizes detached Z buffering in conjunction with a batching architecture to read and write Z data and pixel data in batches, thereby reducing paging overhead.

BACKGROUND OF THE INVENTION

Many high performance graphics memory systems "attach" the memory for the Z coordinate, commonly referred to as the Z buffer, to the memory for the pixel color, commonly referred to as the image buffer, so that the Z coordinate and the color values for the pixel can reside in the same memory page, i.e., the same row address, of the frame buffer memory of the graphics memory system. In these types of systems, a pixel is processed by reading the old Z coordinate for the pixel from the Z buffer, comparing the old Z coordinate with a new Z coordinate, and, if the new Z coordinate passes the Z comparison test, writing the new Z coordinate and the associated pixel color into the Z buffer and image buffer, respectively, of the frame buffer memory. Once these steps have been performed, the next pixel is processed in an identical manner.

The Z comparison test is performed to determine whether the new pixel (i.e., the Z coordinate and color) is in front of the old pixel on the screen and needs to be written into the frame buffer memory or whether it can be discarded. If the Z coordinate associated with an X,Y screen coordinate is behind the Z coordinate contained in the Z buffer memory that is associated with that same screen coordinate, the new pixel can be discarded because the new pixel would not be viewable on the display monitor even if it was displayed. This situation corresponds to a Z comparison failure.

Since the Z coordinate and the color for a particular pixel are stored in the same page in the frame buffer memory, attachment of the Z coordinate to the pixel color eliminates the need for "re-paging", i.e., closing the current page of memory and opening a new page of memory when switching between Z coordinate accesses and color accesses. However, attachment of the Z coordinate to the color produces an undesirable side effect as well, namely, it reduces the size of a page in XY screen coordinates. A page of synchronous graphics RAM (SGRAM) memory may store, for example, 1024 bytes. If this page is shared for 16-bit pixel color and Z coordinate values, then only 512 bytes are available to be used for the colors while the other 512 bytes must be used for the Z coordinates. Thus, the shape of the page in two-dimensional screen coordinate space might be 32×8 pixels, whereas if the memory for Z coordinates were detached and moved into a different page, the shape of the page in accordance with this example, could be 32×16 pixels. The taller page would be advantageous for both vectors and triangles.

Another undesirable side effect caused by attaching the Z memory to the pixel color memory so that each pixel can be processed to completion before processing begins on the next pixel, is that bus inefficiencies result. Specifically, processing a pixel to completion before beginning processing on the next pixel wastes bus bandwidth because each time the memory bus is "turned around", i.e., changed from reads to writes or from writes to reads, dead states must be utilized to avoid bus contention problems and to satisfy pipe latencies.

Graphics operating systems for personal computers (PCs) usually allocate Z buffer memory independently from allocations for image buffer memory. Therefore, for PC graphics operating systems, it is preferable to utilize a graphics memory architecture that detaches the Z buffer from their associated image buffer to provide independent allocation for this memory. However, as stated above, detachment of the Z buffer from the image buffer requires that the frame buffer memory be re-paged each time accesses to the frame buffer memory are switched between Z coordinate accesses and color accesses, which can eliminate advantages attributable to the resulting larger page size.

Accordingly, a need exists for a graphics memory system that utilizes detached Z buffering to obtain the advantages thereof while eliminating the inefficiencies associated with re-paging when switching between a Z access and the associated color access for each pixel.

SUMMARY OF THE INVENTION

The present invention provides a graphics memory system of a computer graphics display system which utilizes a batching architecture in conjunction with detached Z buffering for minimizing paging overhead. The graphics memory system comprises a memory controller which receives a batch of pixels from a host CPU of the computer graphics display system when a 3D rendering mode is in effect. Each pixel comprises a pixel color and corresponding Z coordinate data. The memory controller then performs a Z comparison test wherein Z coordinate data of the batch is compared with existing Z coordinate data stored in a frame buffer memory to determine whether or not each new pixel of the batch associated with the Z coordinate being compared should be written into the frame buffer memory. If the results of a Z comparison test pass, the new pixel color and Z coordinate data are queued for writing into the frame buffer memory.

In accordance with the preferred embodiment of the present invention, two memory controllers are implemented in the graphics memory system, each accessing its own frame buffer memory, which is comprised of a RAM storage device. Each of the frame buffer memory elements comprises an image buffer region and a Z buffer region. The image buffer region is separate from the Z buffer region. Z coordinate data are stored in the Z buffer region and pixel colors are stored in the image buffer region. Therefore, the Z coordinate data is "detached" from the pixel colors.

Each of the memory controllers preferably comprises a Write Z FIFO, a Read Z FIFO, a Write Pixel FIFO, and a RAM controller. These FIFOs are chosen to have a size which is appropriate for the batch size being utilized The memory controllers preferably are identical in nature. The Z coordinate data received by the memory controller from its respective frame buffer memory element are read out of addresses of the frame buffer memory element which correspond to addresses stored by the RAM controller in the Z Read FIFO. If the Z comparison passes, the new Z coordinate data is written into the Write Z FIFO and the corresponding pixel colors are written into the Write Pixel FIFO. The Z coordinate data written into the Write Z FIFO are stored by the RAM controller at addresses corresponding to the addresses stored in the Z Read FIFO. The pixel colors written into the Write Pixel FIFO are stored by the RAM controller at their associated row and column addresses in the frame buffer memory.

In accordance with the preferred embodiment of the present invention, the results of the Z comparison test for a batch are provided to both of the memory controllers. The results of the Z comparison tests are preferably stored in a Z Compare Results FIFO. Each pixel color has an identification tag associated with it and each Z comparison test result has an identification tag associated with it. The memory controllers determine whether an identification tag of a pixel color matches an identification tag of a Z comparison test result. When a match occurs, the memory controller analyzes the Z comparison result to determine whether the pixel color associated with the matching identification tag should be saved in the frame buffer memory. Whenever a match is found, an acknowledgment is provided to the Z Compare Result FIFO which causes the corresponding compare result to be unloaded from the Z Compare Result FIFO.

Other features and advantages of the present invention will become apparent from the following discussion, drawings and claims.

DETAILED DESCRIPTION OF THE INVENTION

Figure 1:
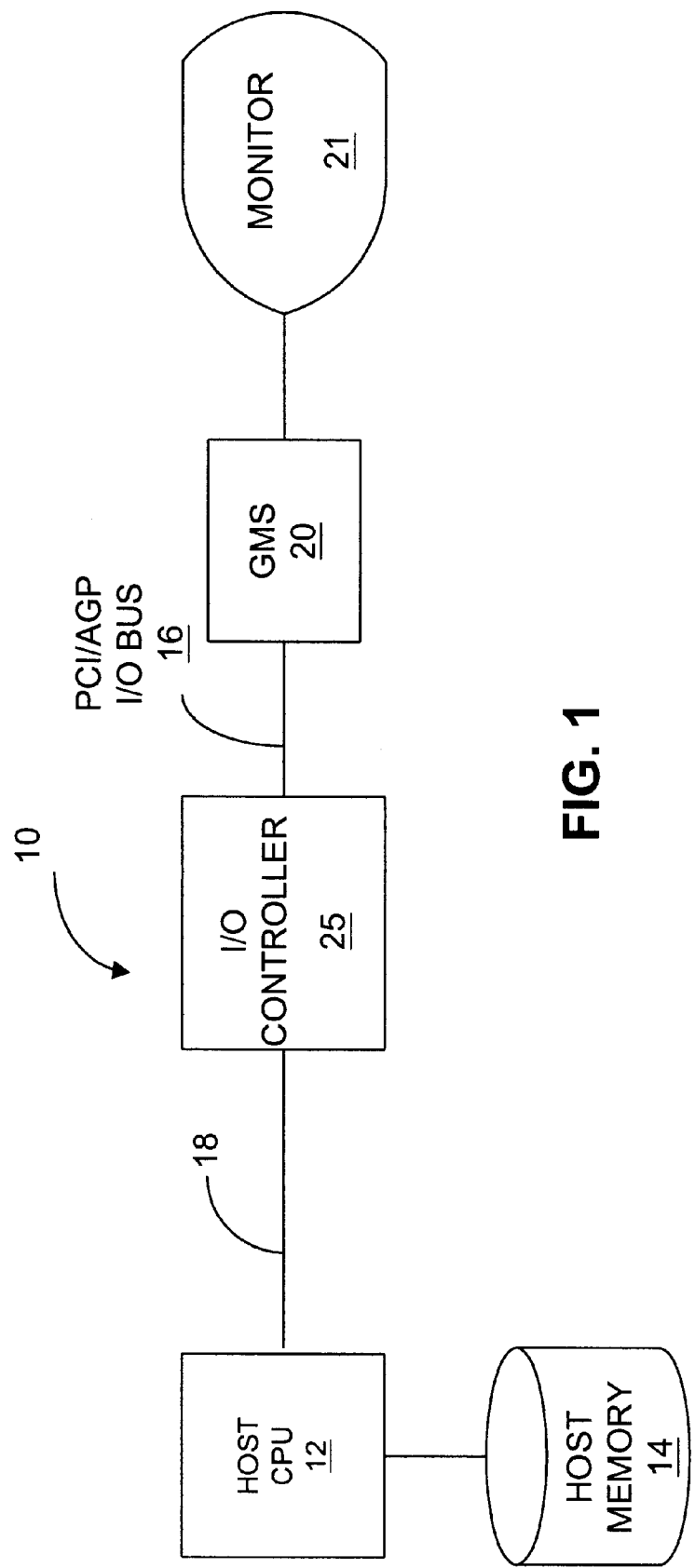
FIG. 1 is a block diagram of a computer graphics display system incorporating the graphics memory system of the present invention.

FIG. 1 is a block diagram of the computer graphics display system 10 of the present invention. The computer graphics display system 10 comprises a host CPU 12, a host memory device 14, a local bus 18, an input/output (I/O) controller device 25, an advanced graphics port/peripheral component interconnect (AGP/PCI) interface bus 16, a graphics memory system 20, and a monitor 21 for displaying graphics information output from the graphics memory system 20.

The host CPU 12 processes input received from the console (not shown) of the computer graphics display system 10 and outputs commands and data over the local bus 18 to the I/O interface controller 25. The I/O interface controller 25 formats the commands and data utilizing the protocols of the PCI/AGP interface bus 16. The information received over the PCI/AGP interface bus 16 is input to the graphics memory system (GMS) 20. The graphics memory system 20 then processes this information and causes graphics images to be displayed on the monitor 21.

Figure 2:
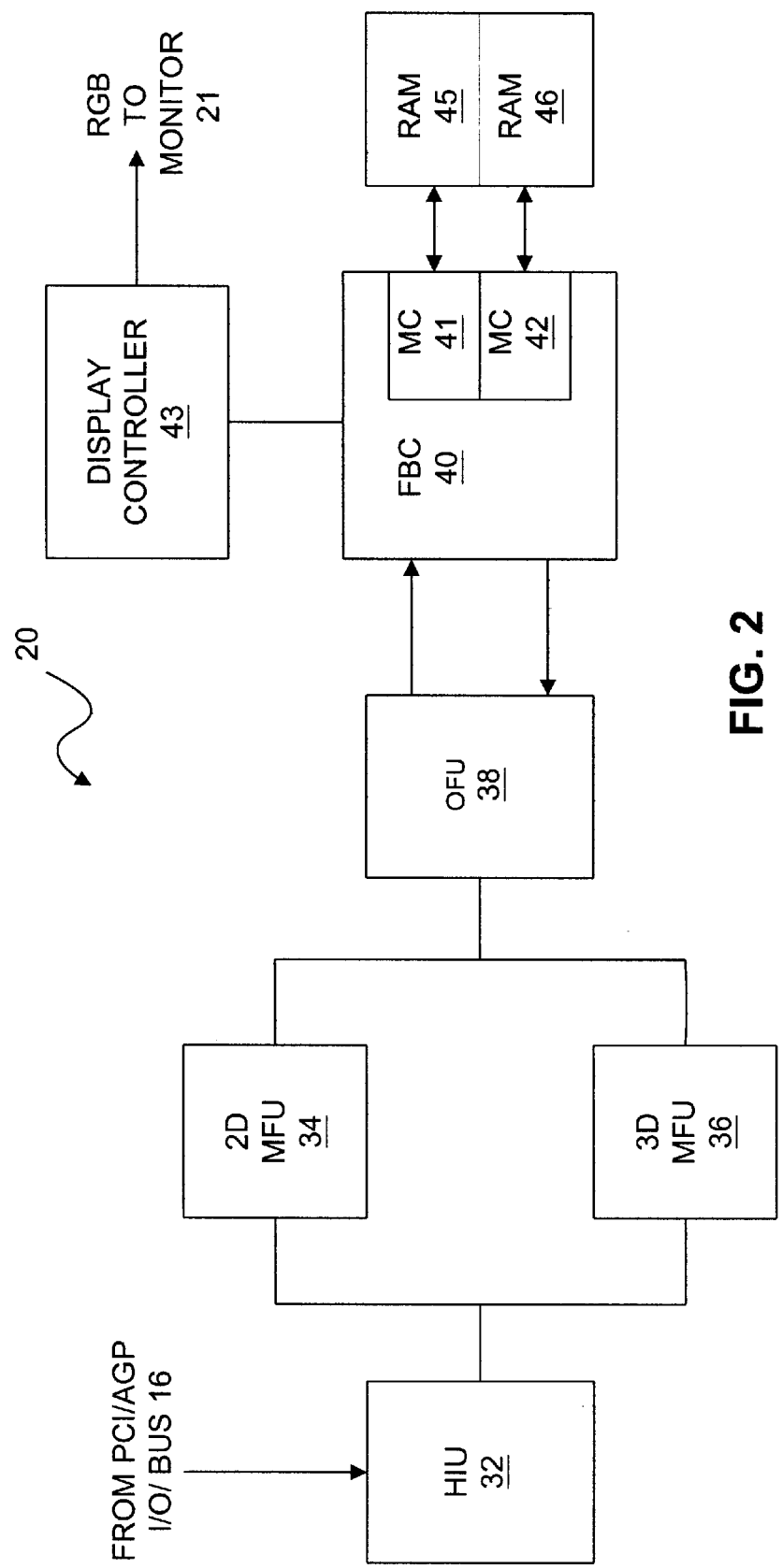
FIG. 2 is a block diagram of the graphics memory system of the computer graphics display system shown in FIG. 1.

FIG. 2 is a block diagram of the graphics memory system 20 of the present invention in accordance with the preferred embodiment. The host interface unit (HIU) 32, the 2D and 3D macro-function units (MFUs) 34, 36, the object function unit (OFU) 38, the frame buffer controller (FBC) 40 and the display controller 43 of the graphics memory systems 20 are typical components in graphics display systems. Therefore, only a cursory explanation of the functions of these components will be provided herein since persons skilled in the art will understand the types of operations that are performed by these components.

The host interface unit 32 fetches command data packets and texture maps from the host memory 14 via the PCI/AGP bus 16. The host interface unit 32 then provides graphics 2D information to the 2D macro-function unit 34 and 3D information to the 3D macro-function unit 36. The 2D macro-function unit 34 generates 2D vectors, text and rectangle spans. The 3D macro-function unit 36 performs triangle setup, 3D rastorization, and texture mapping.

The output from the 2D and 3D macro-function units 34 and 36 is received by the object function unit 38. The object function unit 38 performs rectangle clipping, patterning, frame buffer-to-frame buffer block transfers and rectangle span fills. The output of the object function unit 38 is received by the frame buffer controller (FBC) 40. The frame buffer controller 40 dispatches requests to the memory controllers (MC0 and MC1) 41 and 42 to cause memory controller 41 and memory controller 42 to write and read pixel colors and Z coordinates to and from RAM 45 and RAM 46. The frame buffer controller 40 also fetches display information which is sent to the display controller 43. The display controller 43 receives the display information and converts it into red, green and blue (RGB) analog data and sends it to the display monitor 21.

Figure 3:
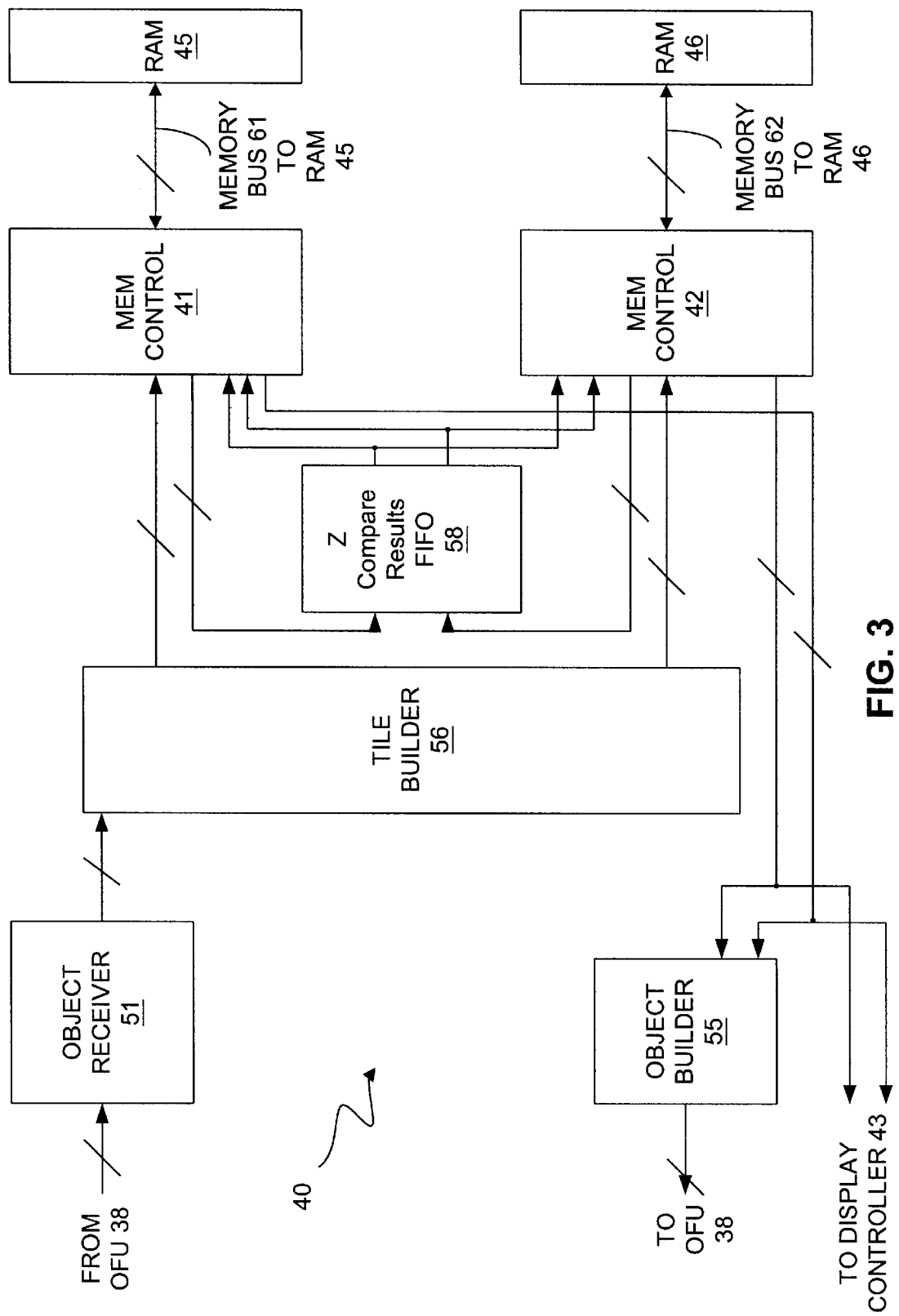
FIG. 3 is a block diagram of the frame buffer controller of the graphics memory system shown in FIG. 2 in accordance with the preferred embodiment of the present invention.

FIG. 3 is a block diagram of the frame buffer controller 40 of the present invention in accordance with the preferred embodiment. The object receiver 51 and the object builder 55 are both in communication with the object function unit 38. The object builder 55 receives pixel data from the memory controllers 41 and 42 read out of RAM 45 and RAM 46, respectively, and provides the read data to the object function unit 38. The object builder 55 receives 32-bit data from each of the memory controllers 41 and 42 and reformats the data if necessary and builds 64-bit objects for use by the object function unit 38. The object receiver 51 receives X, Y and Z screen coordinates and Y, U, V or R, G, B color data from the object function unit 38, converts the color data into R, G, B format if necessary, and provides the coordinate and R, G, B color data to the tile builder 56. The tile builder 56 builds tiles, which are 32-bit words of Z coordinate data and color data, and maps the X and V screen coordinates into tile row and column addresses corresponding to locations in the RAM 45 and RAM 46.

The tile builder 56 outputs tiles of Z data and color data along with their corresponding row and column addresses to the memory controllers 41 and 42. The tile builder 56 also inserts a batch delimiter after the last tile of the coherent batch of pixels (i.e., no two pixels within a batch having the same X, Y address). In accordance with the preferred embodiment of the present invention, two memory controllers and two RAM memory devices are implemented in the graphics memory system 20. However, it will be understood by those skilled in the art that the present invention is not limited with respect to the number of memory controllers that are implemented in the graphics memory system 20. The use of multiple memory controllers enhances the performance of the graphics memory system 10 of the present invention, as will be understood by those skilled in the art. The batching architecture and technique of the present invention can be used with a single memory controller and a single frame buffer memory element.

Each of the memory controllers 41 and 42 receives Z row and column addresses, pixel row and column addresses, and pixel color data. Each of the RAM memory elements 45 and 46 comprises an image buffer storage area (not shown) and a Z buffer storage area (not shown). The pixel color data is stored in the image buffer storage area and the Z coordinate data is stored in the Z buffer storage area. Thus, the present invention utilizes detached Z buffering in that the Z coordinates are not interleaved with the color values, but rather are stored in a separate area of RAM.

In accordance with the present invention, Z coordinate data is read out of RAM 45 and RAM 46 by memory controllers 41 and 42 in batches so that the bus turn around time, i.e., the number of states required for the RAM bus 61 or 62 to switch between read and write transactions, is amortized over a plurality of pixels. By amortizing the bus turn around time over a plurality of pixels, any processing latencies associated with detached Z buffering are minimized. Furthermore, re-paging is also amortized over a plurality of pixels, thereby reducing paging overhead.

The batching architecture and technique of the present invention will now be described with respect to only memory controller 41 and RAM element 45, since the memory controllers 41 and 42 function identically. It should be noted that the memory controllers 41 and 42 are capable of processing batches of data simultaneously. Therefore, operations which are identical to the operations discussed below of the memory controller 41 in conjunction with RAM 45 may be concurrently performed by memory controller 42 in conjunction with RAM 46.

Memory controller 41 compares a batch of new Z coordinate data received from the tile builder 56 with a batch of Z coordinate data read out of RAM 45. As each Z coordinate is compared, the Z comparison results are queued in the Z Compare Results FIFO 58 for use by either of the memory controllers 41 and 42 to determine whether the new color corresponding to the Z coordinate compared must be written into the RAM of the respective memory controller or whether the new color can be discarded. The purpose of the Z Comparison Results FIFO 58 is discussed in more detail below with respect to FIG. 4.

Re-paging overhead will be reduced in most cases due to the fact that a large number of pixels will be processed within a batch. Most of the time, for small batches, re-paging occurs only when accesses are switched from pixel color writes to Z coordinate data reads, or from Z coordinate data writes to pixel color writes. For large batches, when re-paging is required within a batch of Z reads, Z writes, color reads, or color writes, the extra re-paging can be "hidden" and, therefore, generates little or no overhead.

Figure 4:
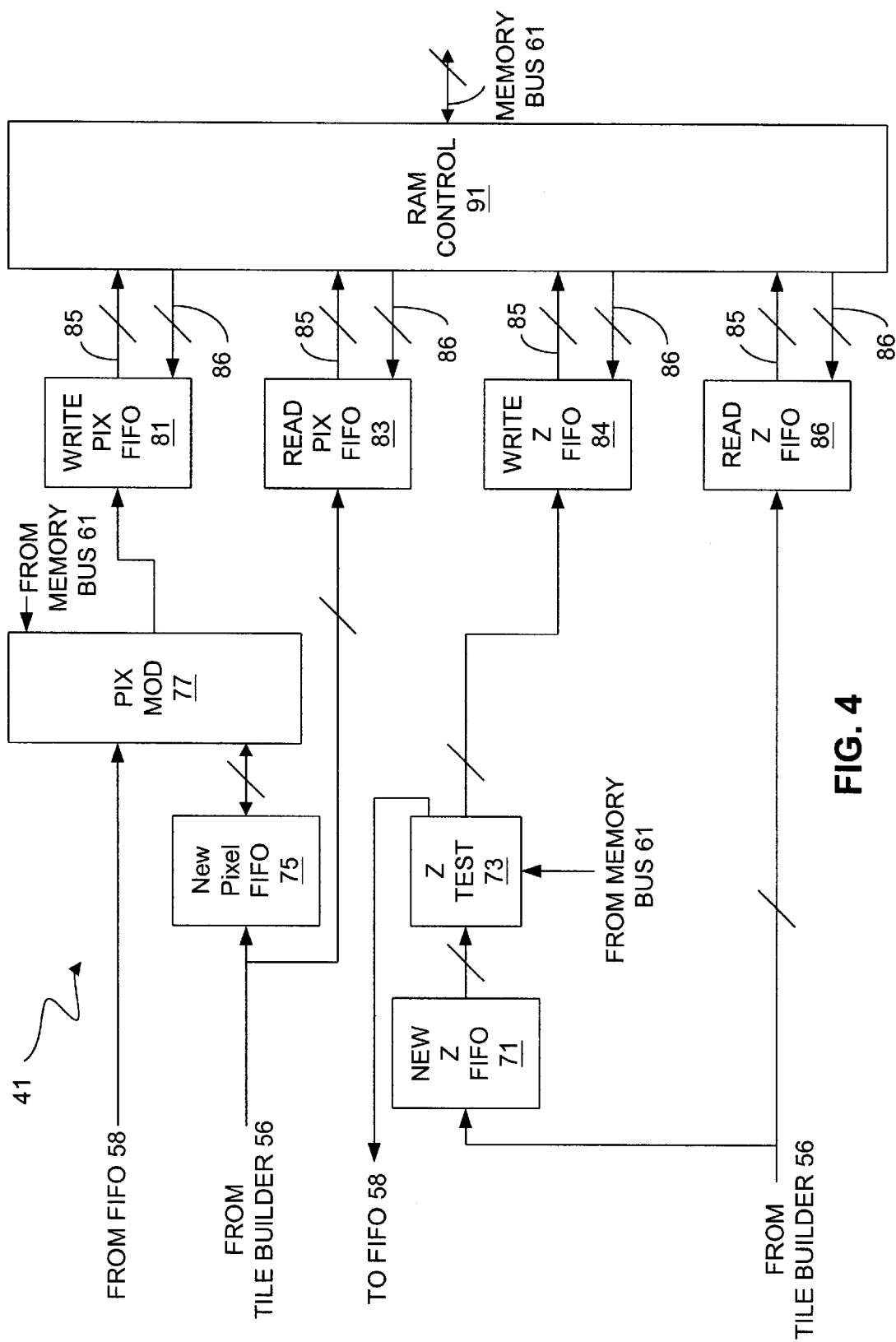
FIG. 4 is a block diagram of one of the memory controllers of the frame buffer controller shown in FIG. 3 in accordance with the preferred embodiment of the present invention.

FIG. 4 is a detailed block diagram of the memory controller 41 shown in FIG. 3. The batching technique of the present invention in accordance with the preferred embodiment will now be discussed with respect to FIG. 4. A batching sequence begins when the tile builder 56 writes a pixel color and its corresponding Z coordinate data to the memory controller 41. The Z coordinate is written to the New Z FIFO 71 and the corresponding Z coordinate row/column address is written to the Read Z FIFO 86. The new pixel color row/column address and color data are written to the New Pixel FIFO 75. These writes continue until the New Z FIFO 71 and the New Pixel FIFO 75 fill up. This allows multiple batches of data to be queued up while the current batch is being processed.

In accordance with the preferred embodiment of the present invention, a batch will consist of a group of write requests that is limited in size to ensure data coherency and to prevent the FIFOs of the memory controller 41 from being overflowed. Each request of the batch will correspond to a different address in RAM 45. The boundaries of the batches are identified by batch delimiters which notify the memory controller 41 that the end of a batch has occurred. The batch boundaries are defined in the computer graphics display system 10 in accordance with a predetermined criterion, which is selected by the system designer in accordance with practical considerations, as will be understood by those skilled in the art. Batch delimiters are generally known in the art and, therefore, a detailed discussion of their use with the present invention will not be provided herein. It will be understood by those skilled in the art that the present invention is not limited to any particular technique for identifying the boundaries of a batch.

In accordance with the preferred embodiment of the present invention, the memory controller 41 uses the batch delimiter for control during batch processing. Batch delimiters are written to the New Pixel FIFO 75, to the Read Pixel FIFO 83, and to the Read Z FIFO 86. Once the Z address has be written to the Read Z FIFO 86, the RAM controller 91 will read the contents of the Read Z FIFO 86 and cause the corresponding Z coordinate data to be read out of RAM 45 onto the memory bus 61 and written from the memory bus 61 into the Z test component 73. For all Z coordinate data transferred from RAM 45 into the Z test component 73, corresponding new Z coordinate data is transferred from the New Z FIFO 71 into the Z test component 73. The Z test component 73 compares these values and, if the comparison passes, the new Z coordinate data is written into the Write Z FIFO 84.

Once the RAM controller 91 detects the batch delimiter in the Read Z FIFO 86, a switch is made to the Write Z FIFO 84, which stores any new Z coordinate data that passed the Z comparison test for the batch. Any valid data in the Write Z FIFO 84 is then written into RAM 45 by the RAM controller 91. Since it is possible for some or all of the Z comparisons to fail, some type of mechanism is needed to inform the RAM controller 91 when to stop looking for Z write data. Preferably, a "timeout" mechanism is used by the RAM controller 91 to determine when to stop looking for new Z write data.

The results of the Z comparison test also are written by the Z test component 73 into the Z Compare Results FIFO 58 simultaneously with the writes into the Z Write FIFO 84. The results stored in the Z Compare Results FIFO 58 are provided to the pixel modifier component 77 of both the memory controllers 41 and 42. The pixel modifier component 77 uses the Z compare results provided to it to determine whether to pass the corresponding new pixel color, which is contained in the New Pixel FIFO 75, down the pipe of the pixel modifier component 77 or whether to discard it. Any pixel color and its corresponding address that is passed through the pixel modifier component 77 ultimately is loaded into the Write Pixel FIFO 81.

When the time-out period mentioned above has expired and the Write Z FIFO 84 becomes empty, the RAM controller 91 switches from the Write Z FIFO 84 to the Write Pixel FIFO 81 and the new pixel colors are written by the RAM controller 91 into RAM 45. By the time the RAM controller 91 switches to the Write Pixel FIFO 81, pixel color write requests will have already been queued up so that the batch of pixel addresses and colors stored in the Write Pixel FIFO 81 are ready to be written into RAM 45.

The pixel modifier component 77 can also perform read-modify-write (RMW) operations, such as blending, on the new pixel color. RMW operations require the use of the old pixel color corresponding to the same screen coordinates as the new pixel color. To accomplish these RMW functions, the pixel address that is written by the tile builder 56 into the New Pixel FIFO 75 is also written into the Read Pixel FIFO 83. When one of these types of operations is to be performed, the RAM controller 91 will switch to the Read Pixel FIFO 83 before any switch is made to the Write Pixel FIFO 81. The old pixel color corresponding to the address stored in the Read Pixel FIFO 83 is fetched for the pixel modifier component 77. The modified pixel color is then written into the Write Pixel FIFO 81. These fetches are continued for the entire batch while modified pixel colors are queued in the Write Pixel FIFO 81. When the RAM controller 91 detects a batch delimiter in the Read Pixel FIFO 83, the RAM controller 91 will stop fetching and switch to the Write Pixel FIFO 81 and the modified pixel colors stored in the Write Pixel FIFO 81 will be stored in RAM 45.

The RAM controller 91 will continue writing new or modified pixel colors until a write-pipe-empty indicator (not shown) indicates completion of the current batch. When this occurs, the RAM controller 91 will switch as necessary to begin processing of the next batch.

As stated above, the results of the Z comparison performed by the Z Test component 73 are provided to the Z Compare Results FIFO 58 shown in FIG. 3. Each of the memory controllers 41 and 42 preferably are identical and, therefore, each comprises a Z Test component 73 Such as that shown in FIG. 4. In accordance with the preferred embodiment of the present invention, the results of each of the Z Test components 73 of the memory controllers 41 and 42 are provided to the Z Compare Results FIFO 58, as shown in FIG. 3. This feature of the present invention allows Z compares to be performed in one of the memory controllers while the processing of the corresponding pixel address and color are performed in the other memory controller.

One of the problems associated with using multiple memory controllers in graphics memory systems is the possibility that a Z coordinate will be processed in one memory controller while the corresponding pixel color is processed in another, which can result in difficulties in associating a particular pixel with its corresponding Z coordinate. In an effort to solve this problem, some graphics memory systems provide synchronization between the memory controllers to ensure that Z comparisons are synchronized with their respective pixels. However, this solution creates other problems, such as larger tile sizes, reduced tile efficiencies and loss of independence between memory controllers.

The present invention overcomes this problem by storing the results of the Z comparison from each Z Test component in the Z Compare Results FIFO 58 and tagging the results with an identification (ID) provided by the tile builder 56. The Z Compare Results FIFO 58 then provides the Z comparison results to both of the memory controllers 41 and 42. The Z comparison results provided to the memory controllers 41 and 42 are received by their respective pixel modifier components 77 along with their respective ID tags. The ID tags indicate to the pixel modifier component 77 which pixel the Z comparison result is associated with. The ID tags have sufficient resolution with respect to the batch size to prevent aliasing, as will be understood by those skilled in the art.

Whenever the ID tag of the new pixel color within the pixel modifier component 77 matches the ID tag of the result from the Z Comparison Results FIFO 58, the pixel modifier component 77 will provide an acknowledgment to the Z Compare Results FIFO 58 indicating that the Z comparison results associated with the particular ID tan have been used. In response to receiving the acknowledgment, the Z Compare Results FIFO 58 will unload the particular comparison result so that subsequent results can be used.

The new Z coordinate data and the corresponding pixel color are provided with the same ID tag when they are dispatched from the tile builder 56. In this way, the Z comparison results from the Z Test component 73 can also be tagged with the same ID. As stated above, the ID tag must have a sufficient number of bits to identify all of the pixels of a batch. In accordance with the preferred embodiment, the ID tag is six bits in length to provide sufficient resolution to identify a sixty-four-pixel batch. However, it will be understood by those skilled in the art that the present invention is not limited to a six bit ID tag nor to a sixty-four-pixel batch size.

In "batched" architectures that support packed 24-bit frame buffer pixel format, commonly referred to as RGBR format, it is possible to have the color components of a given pixel located in different memory controllers. In accordance with the preferred embodiment of the present invention, the memory controllers 41 and 42 are designed to manage the RGBR format in the event that it is to be utilized. If one memory controller is processing only part of a pixel and the other part is being processed in the other memory controller (as occurs when the RGB components are to be packed for storage in the RGBR format in the image buffer), the pixel modifier component of each memory controller will issue a shared acknowledgment when the corresponding Z comparison result has been utilized. That particular Z comparison result will not be unloaded from the Z Compare Results FIFO 58 until it has been acknowledged by both memory controllers. Each memory controller tags its acknowledgment with a "shared" bit to indicate that another memory controller needs to acknowledge the matched result to the Z Compare Results FIFO 58 before it will unload the particular Z comparison result.

It should be noted that it is not required that the Z comparison results from both memory controllers 41 and 42 be provided to the Z Compare Results FIFO 58. It will be understood by those skilled in the art that other techniques can be used for managing the results of the Z comparison and for maintaining the independence of the memory controllers 41 and 42. It should also be noted that the present invention is not limited to the FIFO architecture described above with respect to FIGS. 3 and 4. The logical functions of the blocks shown in FIGS. 3 and 4 can be implemented in a variety of different manners. For example, a dual-port memory device can be implemented instead of the FIFO architecture described above with respect to FIGS. 3 and 4. The manner in which such a dual-port memory device may be utilized in conjunction with the present invention will be understood by those skilled in the art in view of the description of the present invention provided herein. It will be understood by those skilled in the art that the present invention is not limited to the specific implementation shown in the FIGS.

It should be noted that the present invention has been described with respect to the preferred embodiments of the present invention and that the present invention is not limited to these embodiments. It will be understood by those skilled in the art that modifications can be made to the present invention which are within the scope of the present invention.

What is claimed is:

1. A graphics memory system comprising:

a memory controller receiving a first quantity of Z coordinates and pixel colors, each pixel color being associated with one location on a display screen, each Z coordinate representing a depth in 3-dimensional space of a pixel, each pixel color having a row and column address associated therewith, each row and column address corresponding to a memory location in a memory element such that each pixel color is associated with a particular memory location in the memory element, the memory controller receiving a plurality of Z coordinates from the memory element, the memory controller comparing each Z coordinate received from the memory element with each Z coordinate of the first quantity in accordance with a Z comparison test to determine whether a pixel color associated with a compared Z coordinate of the first quantity should be written into the memory element, wherein if the Z coordinate of the first quantity passes the Z comparison test, a determination is made that a pixel color associated with the compared Z coordinate of the first quantity that passed the Z comparison test is to be saved in the memory element, wherein after the Z comparison test has been preformed on all of the Z coordinates of the first quantity, pixel colors associated with the Z coordinates that passed the Z comparison test are saved in the memory element at the memory locations associated with the pixels, wherein the memory element comprises an image buffer region and a Z buffer region, the image buffer region being separate from the Z buffer region, wherein Z coordinates are stored in the Z buffer region and pixel colors are stored in the image buffer region, wherein by waiting until the Z comparison test has been performed on all of the Z coordinates of said first quantity before storing the pixel colors associated with the Z coordinates that passed the Z comparison test in the image buffer region of the memory element, the number of times that the memory element must be re-paged when switching between Z-coordinate accesses of the Z buffer region and pixel color accesses of the image buffer region is reduced, wherein the memory controller further comprises a Write Z FIFO, a Read Z FIFO, a Write Pixel FIFO, and a RAM controller, wherein the Z coordinates received by the memory controller from the memory element are read out of addresses of the memory element which correspond to addresses stored in the Z Read FIFO by the RAM controller, and wherein if the results of the Z comparison pass, the Z coordinates of the first quantity that were compared to Z coordinates read out of the memory element are written into the Write Z FIFO and the pixel values associated with the compared Z coordinates are written into the Write Pixel FIFO, wherein the Z coordinates written into the Write Z FIFO are stored by the RAM controller at addresses corresponding to the addresses stored in the Z Read FIFO and wherein the pixel values written into the Write Pixel FIFO are stored by the RAM controller at their associated row and column addresses in the memory element.

2. The graphics memory system of claim 1, further comprising a second memory controller, the second memory controller receiving a second quantity of Z coordinates and pixel colors, each pixel color of the second quantity being associated with one location on a display screen, each Z coordinate of the second quantity representing a depth in 3-dimensional space of a pixel, each pixel color of the second quantity having a row and column address associated therewith, each row and column address of each pixel color of the second quantity corresponding to a memory location in a second memory element such that each pixel color of the second quantity is associated with a particular memory location in the second memory element, the second memory controller receiving a plurality of Z coordinates from the second memory element, the second memory controller comparing each Z coordinate received from the second memory element with each Z coordinate of the second quantity in accordance with the Z comparison test in the order pixels were received to determine whether a pixel color associated with a compared Z coordinate of the second quantity should be written into the second memory element, wherein if the Z coordinate of the second quantity passes the Z comparison test, a determination is made that a pixel color associated with the compared Z coordinate of the second quantity that passed the Z comparison test is to be saved in the second memory element, wherein after the Z comparison test has been performed on all of the Z coordinates of the second quantity, pixel colors associated with the Z coordinates that passed the Z comparison test are saved in the second memory element at the memory location associated therewith, wherein Z coordinate processing is performed by one of the memory controllers and pixel color processing is performed by the remaining memory controller.

3. The graphics memory system of claim 2, wherein the first and second quantities constitute a batch, and wherein a plurality of the pixel colors of the first quantity are associated with a plurality of Z coordinates of the second quantity and wherein a plurality of the pixel colors of the second quantity are associated with a plurality of Z coordinates of the first quantity.

4. The graphics memory system of claim 2, wherein the second memory element comprises an image buffer region and a Z buffer region, the image buffer region of the second memory element being separate from the Z buffer region of the second memory element, wherein Z coordinates are stored in the Z buffer region of the second memory element and pixel colors are stored in the image buffer region of the second memory element.

5. The graphics memory system of claim 4, wherein the second memory controller further comprises a second Write Z FIFO, a second Read Z FIFO, a second Write Pixel FIFO, and a second RAM controller, wherein the Z coordinates received by the second memory controller from the second memory element are read out of addresses of the second memory element which correspond to addresses stored in the second Z Read FIFO by the second RAM controller, and wherein if the results of the Z comparison test for the second quantity pass, the Z coordinates of the second quantity that were compared to Z coordinates read out of the memory element are written into the second Write Z FIFO and the pixel values of the second quantity associated with the compared Z coordinates are written into the second Write Pixel FIFO, wherein the Z coordinates written into the second Write Z FIFO are stored by the second RAM controller at addresses corresponding to the addresses stored in the second Z Read FIFO and wherein the pixel values written into the second Write Pixel FIFO are stored by the second RAM controller at their associated row and column addresses in the second memory element.

6. The graphics memory system of claim 2, wherein the results of the comparison test for the first quantity are provided to the first and second memory controllers and wherein the results of the comparison test for the second quantity are provided to the first and second memory controllers.

7. The graphics memory system of claim 6, wherein prior to providing the results of the Z comparison tests for the first and second quantities to the first and second memory controllers, the results of the Z comparison tests for the first and second quantities are stored in a Z Compare Results FIFO.

8. The Graphics memory system of claim 7, wherein each pixel color has an identification tag associated therewith and each Z comparison test result has an identification tag associated therewith, wherein the first memory controller determines whether the identification tag of a pixel color matches an identification tag of a Z comparison test result, wherein when the first memory controller determines that an identification tag of a pixel color matches an identification tag of a Z comparison test result, the first memory controller analyzes the Z comparison result associated with the matching identification tag to determine whether the pixel color associated with the matching identification tag should be saved in the first memory element.

9. The graphics memory system of claim 8, wherein the second memory controller determines whether the identification tag of a pixel color matches an identification tag of a Z comparison test result, wherein when the second memory controller determines that an identification tag of a pixel color matches an identification tag of a Z comparison test result, the second memory controller analyzes the Z comparison result associated with the matching identification tag to determine whether the pixel color associated with the matching identification tag should be written into the second memory element.

10. A graphics memory system comprising:
a memory controller receiving a first quantity of Z coordinates and pixel colors, each pixel color being associated with one location on a display screen, each Z coordinate representing a depth in 3-dimensional space of a pixel, each pixel color having a row and column address associated therewith, each row and column address corresponding to a memory location in a memory element such that each pixel color is associated with a particular memory location in the memory element, the memory controller receiving a plurality of Z coordinates from the memory element, the memory controller comparing each Z coordinate received from the memory element with each Z coordinate of the first quantity in accordance with a Z comparison test to determine whether a pixel color associated with a compared Z coordinate of the first quantity should be written into the memory element, wherein if the Z coordinate of the first quantity passes the Z comparison test, a determination is made that a pixel color associated with the compared Z coordinate of the first quantity that passed the Z comparison test is to be saved in the memory element, wherein after the Z comparison test has been performed on all of the Z coordinates of the first quantity, pixel colors associated with the Z coordinates that passed the Z comparison test are saved in the memory element at the memory locations associated with the pixels, wherein the memory element comprises an image buffer region and a Z buffer region, the image buffer region being separate from the Z buffer region, wherein Z coordinates are stored in the Z buffer region and pixel colors are stored in the image buffer region, and wherein by waiting until the Z comparison test has been performed on all of the Z coordinates of said first quantity before storing the pixel colors associated with the Z coordinates that passed the Z comparison test in the image buffer region of the memory element, the number of times that the memory element must be re-paged when switching between Z-coordinate accesses of the Z buffer region and pixel color accesses of the image buffer region is reduced;

a second memory controller, the second memory controller receiving a second quantity of Z coordinates and pixel colors, each pixel color of the second quantity being associated with one location on a display screen, each Z coordinate of the second quantity representing a depth in 3-dimensional space of a pixel, each pixel color of the second quantity having a row and column address associated therewith, each row and column address of each pixel color of the second quantity corresponding to a memory location in a second memory element such that each pixel color of the second quantity is associated with a particular memory location in the second memory element, the second memory controller receiving a plurality of Z coordinates from the second memory element, the second memory controller comparing each Z coordinate received from the second memory element with each Z coordinate of the second quantity in accordance with the Z comparison test in the order pixels were received to determine whether a pixel color associated with a compared Z coordinate of the second quantity should be written into the second memory element, wherein if the Z coordinate of the second quantity passes the Z comparison test, a determination is made that a pixel color associated with the compared Z coordinate of the second quantity that passed the Z comparison test is to be saved in the second memory element, wherein after the Z comparison test has been performed on all of the Z coordinates of the second quantity, pixel colors associated with the Z coordinates that passed the Z comparison test are saved in the second memory element at the memory location associated therewith, wherein Z coordinate processing is performed by one of the memory controllers and pixel color processing is performed by the remaining memory controller, wherein the second memory element comprises an image buffer region and a Z buffer region, the image buffer region of the second memory element being separate from the Z buffer region of the second memory element, wherein Z coordinates are stored in the Z buffer region of the second memory element and pixel colors are stored in the image buffer region of the second memory element, wherein the second memory controller further comprises a second Write Z FIFO, a second Read Z FIFO, a second Write Pixel FIFO, and a second RAM controller, wherein the Z coordinates received by the second memory controller from the second memory element are read out of addresses of the second memory element which correspond to addresses stored in the second Z Read FIFO by the second RAM controller, and wherein if the results of the Z comparison test for the second quantity pass, the Z coordinates of the second quantity that were compared to Z coordinates read out of the memory element are written into the second Write Z FIFO and the pixel values of the second quantity associated with the compared Z coordinates are written into the second Write Pixel FIFO, wherein the Z coordinates written into the second Write Z FIFO are stored by the second RAM controller at addresses corresponding to the addresses stored in the second Z Read FIFO and wherein the pixel values written into the second Write Pixel FIFO are stored by the second RAM controller at their associated row and column addresses in the second memory element.

11. A graphics memory system comprising:

a memory controller receiving a first quantity of Z coordinates and pixel colors, each pixel color being associated with one location on a display screen, each Z coordinate representing a depth in 3-dimensional space of a pixel, each pixel color having a row and column address associated therewith, each row and column address corresponding to a memory location in a memory element such that each pixel color is associated with a particular memory location in the memory element, the memory controller receiving a plurality of Z coordinates from the memory element, the memory controller comparing each Z coordinate received from the memory element with each Z coordinate of the first quantity in accordance with a Z comparison test to determine whether a pixel color associated with a compared Z coordinate of the first quantity should be written into the memory element, wherein if the Z coordinate of the first quantity passes the Z comparison test, a determination is made that a pixel color associated with the compared Z coordinate of the first quantity that passed the Z comparison test is to be saved in the memory element, wherein after the Z comparison test has been performed on all of the Z coordinates of the first quantity, pixel colors associated with the Z coordinates that passed the Z comparison test are saved in the memory element at the memory locations associated with the pixels, wherein the memory element comprises an image buffer region and a Z buffer region, the image buffer region being separate from the Z buffer region, wherein Z coordinates are stored in the Z buffer region and pixel colors are stored in the image buffer region, and wherein by waiting until the Z comparison test has been performed on all of the Z coordinates of said first quantity before storing the pixel colors associated with the Z coordinates that passed the Z comparison test in the image buffer region of the memory element, the number of times that the memory element must be re-paged when switching between Z-coordinate accesses of the Z buffer region and pixel color accesses of the image buffer region is reduced; and a second memory controller, the second memory controller receiving a second quantity of Z coordinates and pixel colors, each pixel color of the second quantity being associated with one location on a display screen, each Z coordinate of the second quantity representing a depth in 3-dimensional space of a pixel, each pixel color of the second quantity having a row and column address associated therewith, each row and column address of each pixel color of the second quantity corresponding to a memory location in a second memory element such that each pixel color of the second quantity is associated with a particular memory location in the second memory element, the second memory controller receiving a plurality of Z coordinates from the second memory element, the second memory controller comparing each Z coordinate received from the second memory element with each Z coordinate of the second quantity in accordance with the Z comparison test in the order pixels were received to determine whether a pixel color associated with a compared Z coordinate of the second quantity should be written into the second memory element, wherein if the Z coordinate of the second quantity passes the Z comparison test, a determination is made that a pixel color associated with the compared Z coordinate of the second quantity that passed the Z comparison test is to be saved in the second memory element, wherein after the Z comparison test has been performed on all of the Z coordinates of the second quantity, pixel colors associated with the Z coordinates that passed the Z comparison test are saved in the second memory element at the memory location associated therewith, wherein Z coordinate processing is performed by one of the memory controllers and pixel color processing is performed by the remaining memory controller, wherein the results of the comparison test for the first quantity are provided to the first and second memory controllers and wherein the results of the comparison test for the second quantity are provided to the first and second memory controllers, and wherein prior to providing the results of the Z comparison tests for the first and second quantities to the first and second memory controllers, the results of the Z comparison tests for the first and second quantities are stored in a Z Compare Results FIFO.

12. The graphics memory system of claim 11, wherein each pixel color has an identification tag associated therewith and each Z comparison test result has an identification tag associated therewith, wherein the first memory controller determines whether the identification tag of a pixel color matches an identification tag of a Z comparison test result, wherein when the first memory controller determines that an identification tag of a pixel color matches an identification tag of a Z comparison test result, the first memory controller analyzes the Z comparison result associated with the matching identification tag to determine whether the pixel color associated with the matching identification tag should be saved in the first memory element.

13. The graphics memory system of claim 12, wherein the second memory controller determines whether the identification tag of a pixel color matches an identification tag of a Z comparison test result, wherein when the second memory controller determines that an identification tag of a pixel color matches an identification tag of a Z comparison test result, the second memory controller analyzes the Z comparison result associated with the matching identification tag to determine whether the pixel color associated with the matching identification tag should be written into the second memory element.

14. A method for processing Z coordinates and pixel colors in a graphics memory system, the method comprising:

saving a plurality of Z coordinates in a frame buffer memory;

saving a plurality of pixel colors in the frame buffer memory;

receiving a quantity of new Z coordinates and new pixel colors in the graphics memory system, each of the new Z coordinates being associated with one of the new pixel colors;

receiving a plurality of the new Z coordinates and a plurality of the new pixel colors in a first memory controller;

reading a plurality of the Z coordinates out of the frame buffer memory into the first memory controller;

comparing each of the Z coordinates read out of the frame buffer memory with one of the new Z coordinates in the first memory controller to determine whether each of the compared new Z coordinates passes or fails a Z comparison test;

if one of the new Z coordinate passes the Z comparison test, storing the new Z coordinate that passed the Z comparison test in the frame buffer memory and storing the new pixel color associated with the Z coordinate that passed the Z comparison test in the frame buffer memory, wherein the frame buffer memory comprises an image buffer region and a Z buffer region, the image buffer region being separate from the Z buffer region, wherein Z coordinates are stored in the Z buffer region and pixel colors are stored in the image buffer region, and wherein by waiting until the Z comparison test has been performed on all of the Z coordinates of said first quantity before storing the pixel colors associated with the Z coordinates that passed the Z comparison test in the image buffer region of the frame buffer memory, the number of times that the frame buffer memory must be re-paged when switching between Z-coordinate accesses of the Z buffer region and pixel color accesses of the image buffer region is reduced;

receiving a plurality of the new Z coordinates and the new pixel colors in a second memory controller;

comparing Z coordinates read out of the frame buffer memory with new Z coordinates received in the second memory controller to determine whether each of the new Z coordinates received in the second memory controller passes or fails a Z comparison test;

if a new Z coordinate passes the Z comparison test, storing the new color pixel value associated with the new Z coordinate that passed the Z comparison test that occurred in the second memory controller in the frame buffer memory and storing the new Z coordinate that passed the Z comparison test that occurred in the second memory controller in the frame buffer memory, wherein prior to storing the new pixel color associated with the new Z coordinate that passed the Z comparison test that occurred in the second memory controller in the frame buffer memory, the new pixel color that is associated with the new Z coordinate that passed the Z comparison test that occurred in the second memory controller is written into a second Write Pixel FIFO, wherein once all of the new Z coordinates have been compared in the second memory controller, all of the new pixel colors contained in the second Write Pixel FIFO are saved in the frame buffer memory, and wherein the new pixel color associated with the new Z coordinate that passed the Z comparison test that occurred in the first memory controller is received in the second memory controller, the first Write Pixel FIFO being comprised by the second memory controller and the second Write Pixel FIFO being comprised by the first memory controller, and wherein each time the Z comparison test is performed in the first memory controller, results of the Z comparison test performed in the first memory controller are saved in a first Z comparison results storage area, and wherein each time the Z comparison test is performed in the second memory controller, the results of the Z comparison test performed in the second memory controller are saved in a second Z comparison results storage area, the results saved in the first and second Z comparison results storage area being provided to the first and second memory controllers, each result of the Z comparison test having an identification tag associated therewith and each new pixel color having an identification tag associated therewith, wherein the first memory controller receives the results from the first and second Z comparison results storage areas and determines whether the identification tags of any of the results match the identification tags of the new pixel colors received in the first memory controller, wherein if the first memory controller determines that a match exists, the first memory controller writes the new pixel color associated with the matching identification tag to the second Write Pixel FIFO, wherein if the second memory controller determines that a match exists, the second memory controller writes the new pixel color associated with the matching identification tag to the first Write Pixel FIFO.

15. The method of claim 14, wherein the first and second Z comparison results storage areas are comprised within a single Z Comparison Results FIFO that is accessible by the first and second memory controllers.

16. A method for processing Z coordinates and pixel colors in a graphics memory system, the method comprising:

saving a plurality of Z coordinates in a frame buffer memory;

saving a plurality of pixel colors in the frame buffer memory;

receiving a quantity of new Z coordinates and new pixel colors in the graphics memory system, each of the new Z coordinates being associated with one of the new pixel colors;

receiving a plurality of the new Z coordinates and a plurality of the new pixel colors in a first memory controller;

reading a plurality of the Z coordinates out of the frame buffer memory into the first memory controller;

comparing each of the Z coordinates read out of the frame buffer memory with one of the new Z coordinates in the first memory controller to determine whether each of the compared new Z coordinates passes or fails a Z comparison test;

if one of the new Z coordinate passes the Z comparison test, storing the new Z coordinate that passed the Z comparison test in the frame buffer memory and storing the new pixel color associated with the Z coordinate that passed the Z comparison test in the frame buffer memory, wherein the frame buffer memory comprises an image buffer region and a Z buffer region, the image buffer region being separate from the Z buffer region, wherein Z coordinates are stored in the Z buffer region and pixel colors are stored in the image buffer region, and wherein by waiting until the Z comparison test has been performed on all of the Z coordinates of said first quantity before storing the pixel colors associated with the Z coordinates that passed the Z comparison test in the image buffer region of the frame buffer memory, the number of times that the frame buffer memory must be re-paged when switching between Z-coordinate accesses of the Z buffer region and pixel color accesses of the image buffer region is reduced;

receiving a plurality of the new Z coordinates and the new pixel colors in a second memory controller;

comparing Z coordinates read out of the frame buffer memory with new Z coordinates received in the second memory controller to determine whether each of the new Z coordinates received in the second memory controller passes or fails a Z comparison test;

if a new Z coordinate passes the Z comparison test, storing the new color pixel value associated with the new Z coordinate that passed the Z comparison test that occurred in the second memory controller in the frame buffer memory and storing the new Z coordinate that passed the Z comparison test that occurred in the second memory controller in the frame buffer memory, wherein prior to storing the new pixel color associated with the new Z coordinate that passed the Z comparison test that occurred in the second memory controller in the frame buffer memory, the new pixel color that is associated with the new Z coordinate that passed the Z comparison test that occurred in the second memory controller is written into a second Write Pixel FIFO, and wherein once all of the new Z coordinates have been compared in the second memory controller, all of the new pixel colors contained in the second Write Pixel FIFO are saved in the frame buffer memory, wherein the new pixel color associated with the new Z coordinate that passed the Z comparison test that occurred in the second memory controller is received in the first memory controller, the first Write Pixel FIFO being comprised by the first memory controller and the second Write Pixel FIFO being comprised by the second memory controller, wherein each time the Z comparison test is performed in the first memory controller, results of the Z comparison test performed in the first memory controller are saved in a first Z comparison results storage area, and wherein each time the Z comparison test is performed in the second memory controller, the results of the Z comparison test performed in the second memory controller are saved in a second Z comparison results storage area, the results saved in the first and second Z comparison results storage area being provided to the first and second memory controllers, each result of the Z comparison test having an identification tag associated therewith and each new pixel color having an identification tag associated therewith, wherein the first memory controller receives the results from the first and second Z comparison results storage areas and determines whether the identification tags of any of the results match the identification tags of the new pixel colors received in the first memory controller, wherein if the first memory controller determines that a match exists, the first memory controller writes the new pixel color associated with the matching identification tag to the first Write Pixel FIFO, wherein if the second memory controller determines that a match exists, the second memory controller writes the new pixel color associated with the matching identification tag to the second Write Pixel FIFO.

17. The method of claim 16, wherein the first and second Z comparison results storage areas are comprised within a single Z Comparison Results FIFO that is accessible by the first and second memory controllers.

* * * * *